United States Patent Office 2,737,603
Patented Mar. 6, 1956

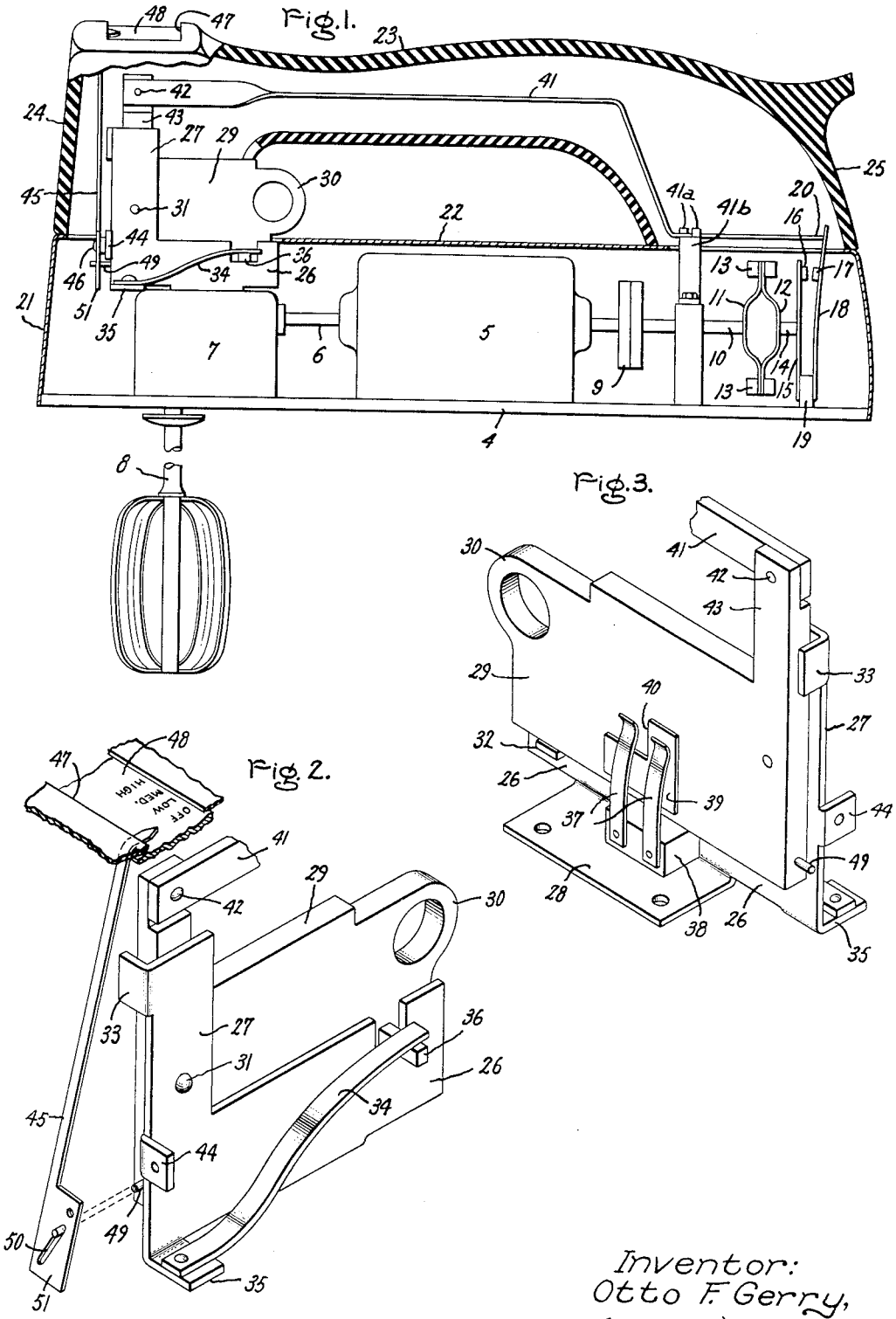

2,737,603

TRIGGER-CONTROLLED SWITCH SPEED GOVERNOR AND INDICATOR FOR FOOD MIXERS AND THE LIKE

Otto F. Gerry, Brockport, N. Y., assignor to General Electric Company, a corporation of New York Application September 24, 1953, Serial No. 382,117

9 Claims. (Cl. 310—68)

The present invention relates to small electric motor driven appliances such as kitchen food mixers and the like which when used are held in the hand and are provided with an "Off" and "On" switch, a speed control means and a speed setting indicator.

The object of the invention is to provide an improved construction and arrangement of switch actuating and speed governor control and indicating means for such an appliance which is simple in structure, convenient to use, reliable in operation, and capable of being manufactured and embodied in the appliance at low cost; also such a mechanism which can be readily built into and for the most part concealed by the handle of the appliance, and which is provided with speed indicating means positioned to be easily read by the operator.

According to the invention, the appliance is provided with a hollow handle supported at its opposite ends by tubular handle posts; in one of the posts is arranged a pivoted trigger switch having an operating end which projects through the post wall to a position beneath the hollow handle where it may be readily grasped by the hand of the operator, the trigger switch having connected therewith means for actuating the speed governor of the electric motor which operates the appliance and means for indicating to the operator the setting of the speed governor.

The invention is especially applicable to relatively small light-weight kitchen food mixers and it is this application of the invention which I have elected specifically to illustrate and describe. It is to be understood however, that this is only by way of example and that the invention may be utilized wherever found applicable.

In the drawing, Fig. 1 is a longitudinal sectional view of a food mixer embodying the invention.

Fig. 2 is a perspective partly exploded view of a part of the mechanism viewed from one side.

Fig. 3 is a perspective view of a part of the same mechanism viewed from the other side.

Referring to the drawing, 4 indicates the base of the food mixer on which is mounted an electric motor 5 having a shaft 6 which through gearing 7 also mounted on the base drives the beater or beaters 8 of the food mixer. The end of shaft 6 opposite that connected to gearing 7 is connected by a coupling 9 to the spindle 10 of a speed governor for the motor.

Insofar as my invention is concerned any type of speed governor having a movable speed control member for regulating the motor speed may be utilized. I have shown somewhat diagrammatically a known type of speed governor comprising a pair of bowed spring straps 11 and 12 carrying weights 13 at their outer ends which weights connect such ends together, the strap 11 being connected to and driven by spindle 10 and the strap 12 being provided with a post 14 which bears against the speed controlling spring blade 15 of the governor. Spring blade 15 has at its outer end a contact 16 which cooperates with a contact 17 on the outer end of a speed setting spring blade 18. The lower ends of blades 15 and 18 are attached to and insulated from each other by a block of insulating material 19 mounted on base 4. In this type of speed governor, blade 18 is biased toward the left as viewed in Fig. 1 to move its contact 17 into engagement with contact 16, and blade 15 is biased toward the left as viewed in Fig. 1 to move its contact 16 out of engagement with contact 17. The speed for the motor is set by positioning a stop 20 which limits movement of blade 18 toward blade 15 and the speed of the motor is held at the speed for which the stop is set by the speed governor effecting movement of blade 15 to move contact 16 out of and into engagement with contact 17.

The structure so far described is to be taken as typical of an appliance such as a kitchen food mixer of the type shown having a movable member such as the stop 20 for setting the speed of its motor.

Mounted on and suitably attached to base 4 to enclose the parts supported thereon is a hood or cover 21, the top wall of which is indicated at 22. Base 4 and hood or cover 21 together form the enclosing casing of the food mixer. Extending longitudinally of cover 21 is a hollow handle 23 having at its opposite ends tubular posts 24 and 25 which are attached to top wall 23 of the cover by suitable means (not shown) to support the handle in spaced relation to cover 21. Supported on the top wall of the casing of gearing 7 is a bracket comprising a base 26 the top edge of which is flush with cover wall 22 and a bracket arm 27 which projects upwardly through an opening in top wall 22 to a position in tubular post 24. It is fastened to the gear casing by an integral base flange 28. Pivotally mounted on bracket arm 27 inside post 24 is a trigger 29 having an end 30 which projects out through an opening in post 24 to a position directly beneath handle 23. Trigger 29 is in the form of a flat plate of suitable insulating material as shown clearly in Figs. 2 and 3. It is pivoted on bracket arm 27 by a shoulder rivet 31 and its pivotal movement is limited by a stop ear 32 on bracket base 26 and a stop ear 33 on bracket 27. The trigger is biased to a position in engagement with stop ear 32 by a leaf spring 34 which at one end is attached to an ear 35 on bracket base 26 and at its other end presses down on a lug 36 fixed on trigger 29.

Trigger 29 is utilized to close a switch for motor 5, to set stop 20 and thus set the speed governor for a desired speed, and to position a speed indicating member which shows the speed for which the governor is set.

The motor switch comprises a pair of spring contact fingers 37 carried by a block 38 of insulating material attached to bracket base 26 which cooperates with a contact plate 39 of suitable conducting metal attached to trigger 29. Plate 39 has a notch 40 in line with one of the contact fingers so that when the trigger is in engagement with stop ear 32, which is its "switch off" position, such spring contact finger is not in engagement with the plate. When the trigger is turned on its pivot in a clockwise direction as viewed in Fig. 3, i. e. its end 30 is moved upwardly toward the underside of handle 23, plate 39 is moved to span the contact fingers to close the switch.

Motor speed setting stop 20 is the outer or free end of a rod or strap 41 which at its inner or forward end is pivotally connected as indicated at 42 to a post 43 which projects upwardly from trigger 29 and forms a part of the trigger. The outer end of rod or strap 41 is guided by ears 41a on a suitable guide bracket 41b. When the trigger is in its down or "switch-off" position, the end of rod or strap 41 engages leaf spring 18 as shown in Fig. 1 to hold contact 17 out of engagement with contact 16. When the trigger is moved on its pivot to close the switch comprising fingers 37 and plate 39, the end of rod or strap 41 is moved away from leaf spring 18 to permit contact 17 to be moved into engagement with contact 16, and then to position such end away from leaf spring 18 a distance such that it will be engaged by the leaf spring when the desired speed is reached so as to hold contact 17 stationary. At the desired speed, the speed governor then regulates the motor speed by moving contact 16 out of and into engagement with contact 17.

The speed indicating member comprises a pointer 45 pivoted adjacent to its lower end on an ear 44 on bracket base 26 as indicated at 46 in Fig. 1. In Fig. 2, pointer 45 is shown detached and spaced away from ear 44 in order better to illustrate the structure. The upper end of pointer 45 extends up through tubular post 24 as shown in Fig. 1, terminating adjacent to a window 47 in handle 23 at the top of the post. In the window is a scale plate 48 over which the pointer moves, the scale plate being provided with suitable indicia as shown in Fig. 2. The connection between the trigger and the pointer whereby the trigger moves the pointer over its scale comprises a pin 49 fixed to the forward edge of the trigger positioned in an angularly extending slot 50 in a head 51 on the lower end of the lever. When the trigger is turned on its pivot, pin 49 rides down and up in slot 50, pushing against the side edges of the slot to effect the turning of the lever.

The motor 5, the spring contacts switch fingers 37 and the speed governor leaf springs 15 and 18 are connected together electrically by suitable wiring (not shown) and to an electric cord having a plug at its end for connection to a source of supply.

In use the operator holds the appliance in the hand by handle 23 and with a part of the hand grasps the end 30 of the trigger. In the present instance the trigger end is shown as having an opening in which a finger of the operator may be positioned. However, any suitable end arrangement may be used which enables the operator readily to grasp it. Then by lifting up or squeezing on the trigger end the operator may turn the trigger to close the switch and position speed setting stop 20 for a desired speed. And at the same time, pointer 45 will be turned on its pivot to indicate the speed setting. The trigger is moved against the biasing action of spring 34 which may have a stiffness to offer the desired resistance to the turning of the trigger, and when the trigger is released the spring returns it to its "switch-off" position. Clearance between the trigger and stops 32 and 33 is of an amount sufficient to permit of the needed trigger movement.

By my invention I provide a mechanism for performing the desired functions which is very simple in structure, easy and handy to operate and capable of being manufactured and assembled at low cost, the several parts being all of simple design. The positioning of the trigger and the indicator at the forward end of the appliance, the indicator being directly over the front handle support post 24 is especially advantageous from the user's standpoint in that it puts the trigger operating end in a very handy position and locates the indicator where it is most convenient for reading; and the utilizing of a tubular front post as a location for the trigger, the pointer and the scale plate is especially advantageous from a manufacturing standpoint in that it enables the manufacturer to use simple, easily assembled parts.

What I claim as new and desire to secure by Letters Patent of the United States is:

1. In an appliance, a casing, an electric motor in the casing, a speed governor for the motor having an adjustable member for setting the motor speed, a handle for the appliance, a tubular post supporting one end of the handle on the casing, a bracket mounted in the casing in line with said tubular post, a movable trigger mounted on the bracket inside said tubular post having an operating end which projects out through the wall of the post to a position beneath said handle, means biasing the trigger toward a position away from the underside of the handle, means forming stops for limiting movement of the trigger, switch means for the motor, means connecting the trigger to said adjustable member, said switch means being arranged for actuation by movement of said trigger, whereby the trigger when moved actuates said switch and adjusts the setting of said movable member, and an indicating means in said tubular post for indicating the setting of the speed governor, said indicating means being visible at an opening at the upper end of said tubular handle supporting post and being connected to the trigger for movement by it.

2. The combination defined by claim 1 wherein the indicating means comprises a pointer pivotally mounted on the bracket, and its connection to the trigger comprises a pin on the trigger positioned in an angularly extending slot in the pointer.

3. In an electric food mixer, a base, an electric motor on the base, a speed governor for the motor having an adjustable member for setting the motor speed, a cover on the base which houses the motor, a handle for the food mixer, a tubular post supporting the handle in spaced relation to the top wall of the cover, a bracket supported on the base in line with said tubular post, a trigger pivotably mounted on said bracket having an operating end which projects to a position beneath said handle, means biasing the trigger to a position away from the underside of said handle, switch means for the motor, means connecting said trigger to said adjustable member, said switch means being arranged for actuation by movement of said trigger, whereby the trigger when moved actuates said switch and adjusts the setting of said adjustable member, and an indicating member connected to said trigger to be positioned by the trigger to indicate the speed setting of said adjustable member.

4. In an electric food mixer, a casing, an electric motor for the casing, beater driving means at the front end of the casing connected to said motor, a speed governor for the motor at the rear end of the casing having a movable member for setting the speed of the motor, a tubular handle for the food mixer, front and rear tubular posts which support the handle in spaced relation to the top wall of the casing, a trigger pivotably mounted in the casing in line with said front tubular post having an operating end which projects to a position beneath said handle, switch means for the motor, means connecting the trigger to said switch means for operating it, means connected to said trigger and extending through said tubular handle for positioning said speed setting member, and means connected to said trigger for indicating the setting of said speed setting member.

5. In an electric food mixer, a casing, an electric motor in the casing, beater driving means at the front end of the casing connected with said motor, a speed governor for the motor at the rear end of the casing having a movable member for setting the speed of the motor, a tubular handle for the food mixer, front and rear tubular posts which support the handle in spaced relation to the top wall of the casing, a trigger pivotably mounted on the casing in line with said front tubular post having an operating end which projects to a position beneath said handle, switch means for the motor, means connecting the trigger to said switch means for operating it, means connected to said trigger and extending through said tubular handle for positioning said speed setting member, and means for indicating the setting of said movable member comprising an indicating pointer connected to and movable by said trigger, said pointer being located in said front tubular post and extending to a point adjacent to the top of the post, and a scale plate at the top of the post over which said pointer moves.

6. In an electric food mixer, a casing, an electric motor in the casing, a handle which extends across the top wall of the casing in spaced relation thereto, a tubular post at the front of the casing for supporting the handle, a trigger pivotably mounted in said tubular post having an operating end which projects out through the post wall to a position beneath the handle, a switch for the motor, a speed governor for the motor having a movable member for setting the speed of the motor, a speed indicating member in said tubular post, said switch means being arranged for actuation by movement of said trigger, and means connecting said trigger to said speed setting movable member and said indicating member for simultaneously operating them.

7. In an electric food mixer, a casing, an electric motor in the casing, a handle which extends across the top wall of the casing in spaced relation thereto, a tubular post at the front of the casing for supporting the handle, a trigger pivotally mounted in said tubular post having an operating end which projects out through the post wall to a position beneath the handle, a switch for the motor, a speed governor for the motor having a movable member for setting the speed of the motor, said switch means being arranged for actuation by movement of said trigger, means connecting said trigger to said speed setting movable member for operating said member, and means for indicating the setting of said speed setting movable member comprising a pointer pivoted at its lower end to the casing in line with and projecting up into said tubular post, a scale at the upper end of said post over which the pointer moves, and means connecting the trigger to said pointer comprising a pin on the trigger and an angularly extending slot in the pointer in which the pin rides.

8. In an electric food mixer, a casing, an electric motor in the casing, a handle which extends across the top wall of the casing in spaced relationship thereto, a tubular post at the front of the casing for supporting said handle, a trigger pivotally mounted in said tubular post and having an operating end which projects out through the post wall to a position beneath the handle, a speed governor for the motor having a movable member for setting the speed of the motor, and means connecting said trigger to said movable member for varying the speed setting of the mixer.

9. The combination of claim 8 wherein a speed indicating member is positioned in said tubular post and includes a pointer located in an exposed position at the top of said tubular post, and wherein said trigger is also connected to said indicating member for actuating said member, whereby movement of said trigger is effective for simultaneously actuating said speed setting movable member and said indicating member.

References Cited in the file of this patent

UNITED STATES PATENTS

| | | |
|---|---|---|
| 2,615,942 | Edman | Oct. 28, 1952 |
| 2,616,673 | Van Guilder | Nov. 4, 1952 |
| 2,642,027 | Kircher | June 16, 1953 |
| 2,671,191 | Braski | Mar. 2, 1954 |